(12) United States Patent
Matsuura

(10) Patent No.: US 7,738,363 B2
(45) Date of Patent: Jun. 15, 2010

(54) NETWORK RELAY APPARATUS

(75) Inventor: Masahiko Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 12/230,389

(22) Filed: Aug. 28, 2008

(65) Prior Publication Data

US 2009/0161534 A1    Jun. 25, 2009

(30) Foreign Application Priority Data

Dec. 19, 2007    (JP) .............................. 2007-327893

(51) Int. Cl.
*H04J 1/16* (2006.01)
(52) U.S. Cl. ...................................... 370/217; 370/226
(58) Field of Classification Search ................. 370/217, 370/226
See application file for complete search history.

(56) References Cited

U.S. PATENT DOCUMENTS

| | | | | |
|---|---|---|---|---|
| 5,796,717 A * | 8/1998 | Shinbashi et al. | ........... | 370/216 |
| 5,805,568 A * | 9/1998 | Shinbashi | ................... | 370/223 |
| 6,721,268 B1 * | 4/2004 | Ohira et al. | ................. | 370/223 |
| 6,888,791 B1 * | 5/2005 | Ellis et al. | .................. | 370/227 |
| 6,941,487 B1 * | 9/2005 | Balakrishnan et al. | ......... | 714/4 |
| 7,443,843 B2 * | 10/2008 | Matsuo et al. | .............. | 370/386 |
| 7,639,604 B2 * | 12/2009 | Wakai et al. | ................. | 370/218 |
| 2004/0199834 A1 * | 10/2004 | Fukae | ......................... | 714/699 |
| 2005/0195736 A1 * | 9/2005 | Matsuda | ..................... | 370/216 |
| 2006/0274782 A1 | 12/2006 | Rikitake | | |
| 2007/0147232 A1 * | 6/2007 | Takehara et al. | ............ | 370/217 |
| 2008/0049610 A1 * | 2/2008 | Linwong et al. | ............ | 370/225 |
| 2008/0316920 A1 * | 12/2008 | Chun et al. | ................. | 370/225 |

FOREIGN PATENT DOCUMENTS

| | | |
|---|---|---|
| JP | 11-055285 | 2/1999 |
| WO | 2005/079015 | 8/2005 |

* cited by examiner

*Primary Examiner*—Andrew Lee
(74) *Attorney, Agent, or Firm*—Staas & Halsey LLP

(57) ABSTRACT

A network relay apparatus receives sub data different from main data by data transmission/reception processing units of a working system and a spare system, and when communication paths of the working system and the spare system are both working normally, makes the sub data flow through the communication path of the spare system. When a failure occurs in the communication path of the working system, the network relay apparatus switches the communication path for the main data to the spare system, and accordingly notifies it to a data relay unit, which is a relay destination of the main data. In the data relay unit, based on a notified content, corresponding relationships of ports in the unit are changed so that the received main data is output from the same output port as before.

3 Claims, 9 Drawing Sheets

FIG.3

| INPUT PORT ID | OUTPUT PORT ID |
|---|---|
| A | B |
| B | A |
| C | D |
| D | C |

NETWORK RELAY APPARATUS

CROSS-REFERENCE TO RELATED APPLICATION(S)

This application is based upon and claims the benefit of priority of the prior Japanese Patent Application No. 2007-327893, filed on Dec. 19, 2007, the entire contents of which are incorporated herein by reference.

BACKGROUND

1. Field

The present invention relates to a network relay apparatus that has a redundant structure with a primary system and a secondary system (i.e., working system and a spare system), and relays data between different networks in a composite network.

2. Description of the Related Art

A technology related to redundancy that provides a spare system in addition to a working system in a network, in case a failure occurs in a node or in a dedicated line that connects nodes has been developed (see Japanese Patent Application Laid-open No. H11-55285 and Japanese Patent Application Laid-open No. 2005-517869).

In recent years, a composite network is configured with Ethernet (registered trademark, hereinafter omitted) networks connected to a synchronous optical network/synchronous digital hierarchy (SONET/SDH) network. In such a composite network, it is also important to handle the similar failures.

The composite network includes an optical transmission apparatus (hereinafter, "network relay apparatus"), which is a node that links the Ethernet network and the SONET/SDH network.

Conventionally, the network relay apparatus in general is configured as described in FIG. 9 to secure redundancy in the node and thereby to prepare for the failure.

The redundancy in the network relay apparatus will now be explained in detail below with reference to FIG. 9. A network relay apparatus 10 includes a switch fabric 20 that performs transmission/reception processing of data with respect to the SONET/SDH network, and an Ethernet interface unit 40 that performs the transmission/reception processing of data with respect to the Ethernet network. The network relay apparatus 10 also includes a switch fabric 30 and an Ethernet interface unit 50, as the respective spare systems for the switch fabric 20 and the Ethernet interface unit 40.

A data relay unit 60 that transmits and receives data to/from the network relay apparatus 10 at a side of the Ethernet network includes a port 70a, a port 70b, a port 80a, and a port 80b. The port 70a and the port 80a are respectively connected to the Ethernet interface unit 40 and the Ethernet interface unit 50. In the data relay unit 60, a communication path for data is established between the port 70a and the port 70b, and between the port 80a and the port 80b.

Referring back to the network relay apparatus 10, the switch fabrics 20 and 30 replicate the received data and output it to the Ethernet interface unit 40 and the Ethernet interface unit 50.

The Ethernet interface units 40 and 50 include switches 41 and 51, respectively, and selectively receive data from the switch fabric 20 or the switch fabric 30. The network relay apparatus 10 breaks the link between the Ethernet interface unit 50 and the port 80a of the spare system, so as not to receive data twice from the data relay unit 60.

In this manner, a communication path for data as shown by a solid line in FIG. 9 is established. If a failure occurs in the switch fabric 20 while main data is actually relayed as shown by solid line arrows (at this time, the switch fabric 30 is also receiving the same data as shown by dotted line arrows), for example, the network relay apparatus 10 handles the failure by switching the switch 41 and relaying the received data by the switch fabric 30.

Similarly, if a failure occurs in the Ethernet interface unit 40 while the main data is actually relayed as shown by the solid line arrows, the network relay apparatus 10 handles the failure by connecting the link between the port 80a and the Ethernet interface unit 50 and relaying the received data by the switch fabric 30. Further to the link connection, the network relay apparatus 10 can handle the failure by switching the switch 51 to relay the data received by the switch fabric 20, if there is no failure in the switch fabric 20.

To obtain redundancy in the node with the configuration of the network relay apparatus 10 as described above, it is also necessary to install the port 80a and the port 80b of the spare system in the data relay unit 60, corresponding to the communication path of the Ethernet interface unit 50 of the spare system in the network relay apparatus 10.

The network relay apparatus 10 breaks the link between the Ethernet interface unit 50 and the port 80a, and prepares for a failure in the network relay apparatus 10, until a failure occurs in the Ethernet interface unit 40 of a working system.

The ports 80a and 80b of the date relay unit 60 well serve the purpose of preparing for the failure in the network relay apparatus 10. However, if the failure does not occur, the ports 80a and 80b will not be used, and may be considered as only being installed. Accordingly, it is preferable that the ports 80a and 80b are used for the other purposes and should be used efficiently.

In other words, the network relay apparatus 10 cannot effectively use the ports 80a and 80b that are installed in the data relay unit 60 to achieve the communication path of the spare system.

SUMMARY

It is an object of the present invention to at least partially solve the problems in the conventional technology.

A network relay apparatus according to one aspect of the present invention performs relay processing of data between a first network and a second network, and is provided with a redundant structure to handle failure in relay processing of main data in a working system using a spare system, and includes: a working-system first data transmission/reception processing unit that performs data transmission/reception processing with respect to the first network, and that includes a sub-data transmission/reception processing unit that performs transmission/reception processing of sub data which is different from the main data with respect to the first network; a working-system second data transmission/reception processing unit that performs data transmission/reception processing with respect to the second network; a spare-system first data transmission/reception processing unit that performs data transmission/reception processing with respect to the first network, and that includes a sub-data transmission/reception processing unit that performs transmission/reception processing of sub data which is different from the main data with respect to the first network; a spare-system second data transmission/reception processing unit that performs data transmission/reception processing with respect to the second network; a data transmission/reception controlling unit that causes the spare-system second data transmission/ reception processing unit to perform the transmission/reception processing of the sub data when the working-system second data transmission/reception processing unit and the spare-system second data transmission/reception processing unit operate normally, and causes a normal one of the working-system second data transmission/reception processing unit and the spare-system second data transmission/reception processing unit to perform the transmission/reception processing of the main data when a failure occurs in one of the working-system second data transmission/reception processing unit and the spare-system second data transmission/reception processing unit; and a notifying unit that notifies, when the data transmission/reception controlling unit causes change in units dealing with the transmission/reception processing of the main data between the working-system second data transmission/reception processing unit and the spare-system second data transmission/reception processing unit, a data relay unit provided with a connection unit for each of the working system and the spare system on a side of the second network, that the main data is now on transmitted to a connection unit which is different from a connection unit which has been receiving the main data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an explanatory view of information stored in a corresponding port reference table storage unit;

DETAILED DESCRIPTION OF THE PREFERRED EMBODIMENTS

Exemplary embodiments of a network relay apparatus according to the present invention will be described in detail below with reference to the accompanying drawings.

First Embodiment

Figure 1:
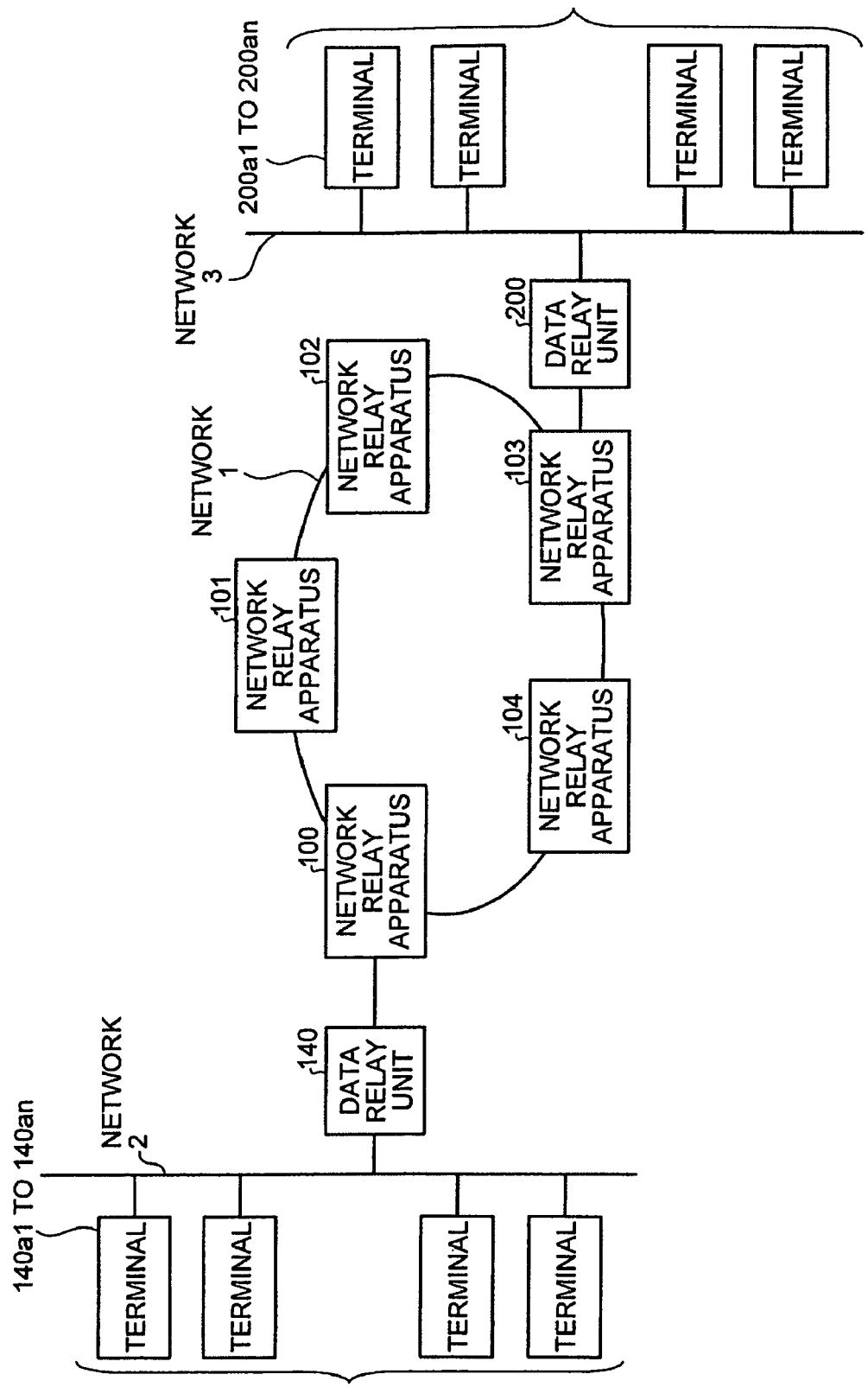
FIG. 1 is a schematic explanatory view of a network relay apparatus according to a first embodiment of the present invention.

A schematic of a network relay apparatus according to a first embodiment of the present invention will be explained at first with reference to FIG. 1. FIG. 1 is a schematic explanatory view of the network relay apparatus according to the first embodiment.

A network relay apparatus 100 forms a network 1 with network relay apparatuses 101 to 104. The network 1, for example, is a network formed based on a communication standard of a synchronous optical network/synchronous digital hierarchy (SONET/SDH).

The network relay apparatus 100 is communicatively connected to a data relay unit 140 that is one of nodes of a network 2. The network 2, for example, is a network formed based on a communication standard of Ethernet.

Similarly, the network relay apparatus 103 in the network 1 is communicatively connected to a data relay unit 200 that is one of nodes of a network 3. The network 3, for example, is a network formed based on the communication standard of Ethernet.

In this manner, the network relay apparatus 100 is one of nodes in a composite network in which the Ethernet networks are connected by the SONET/SDH network.

The network relay apparatus 100 receives data addressed to terminals 140a1 to 140an in the network 2 and transmitted from terminals 200a1 to 200an in the network 3, via the network 1. The network relay apparatus 100, after performing a predetermined process to the received data, transmits the data to the data relay unit 140. The predetermined process, for example, is a process that converts a signal based on the SONET/SDH into an Ethernet frame.

Similarly, the network relay apparatus 100 receives data addressed to the terminals 200a1 to 200an in the network 3 and transmitted from the terminals 140a1 to 140an in the network 2, from the data relay unit 140. The network relay apparatus 100, after performing a predetermined process to the received data, transmits the data to the network relay apparatus 101 or the network relay apparatus 104. The predetermined process, for example, is a process to map Ethernet frame into a signal based on the SONET/SDH.

Figure 2:
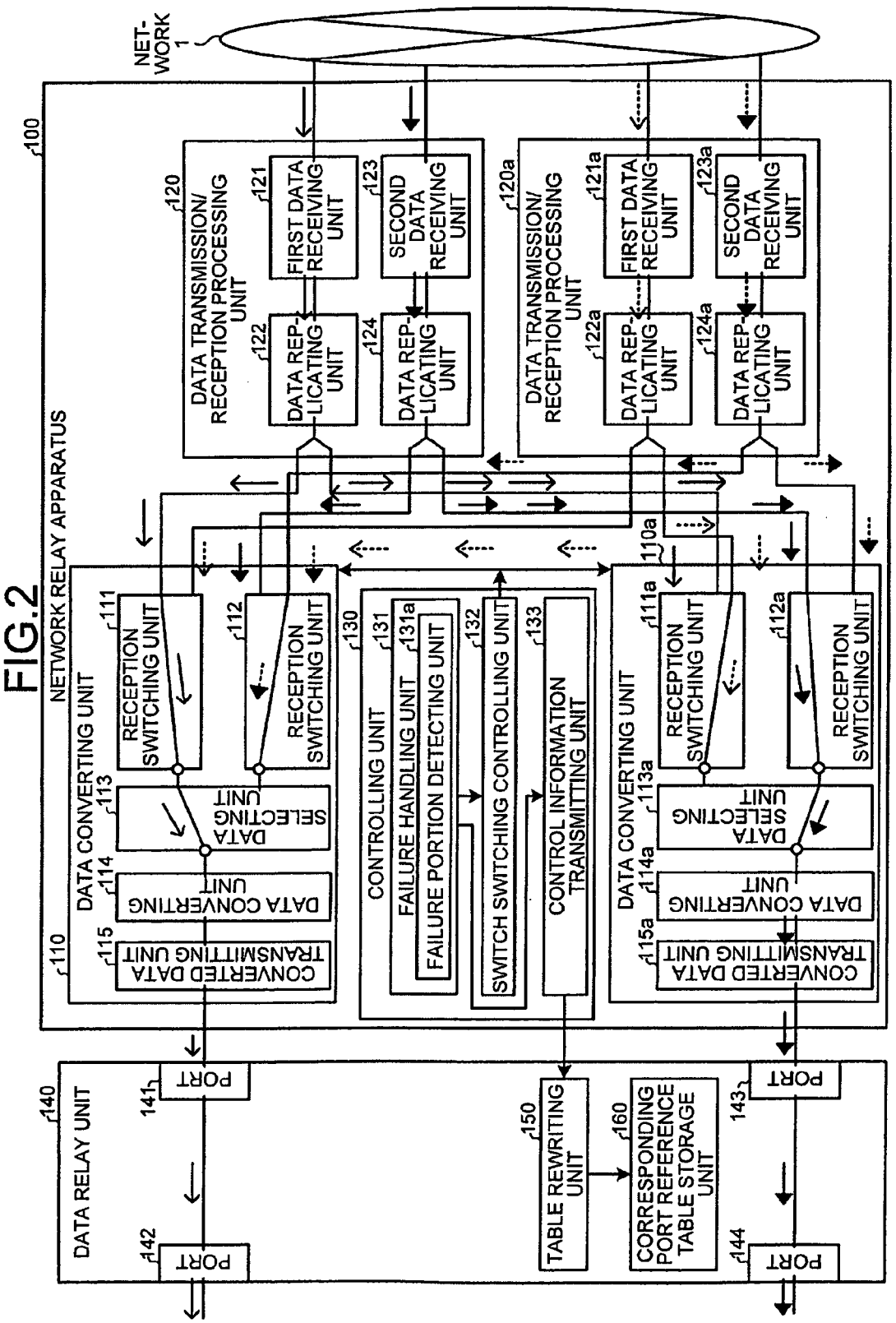
FIG. 2 is a block diagram of a configuration of the network relay apparatus according to the first embodiment and a data relay unit connected to the network relay apparatus.

A configuration of the network relay apparatus according to the first embodiment will now be explained with reference to FIG. 2. FIG. 2 is a block diagram of the configuration of the network relay apparatus according to the first embodiment, and the data relay unit connected to the network relay apparatus. FIG. 2 shows processing units which operate in the network relay apparatus 100, when data addressed to the terminals 140a1 to 140an in the network 2 is transmitted from the terminals 200a1 to 200an in the network 3, and processing units in the data relay unit 140 which operate in relation to the processing units in the network relay apparatus 100. Processing units which operate in the network relay apparatus 100 when data addressed to the terminals 200a1 to 200an in the network 3 is transmitted from the terminals 140a1 to 140an in the network 2 are not shown in the drawing.

As shown in FIG. 2, the network relay apparatus 100 includes a data converting unit 110, a data transmission/reception processing unit 120, and a controlling unit 130. The network relay apparatus 100 also includes a data converting unit 110a and a data transmission/reception processing unit 120a, as spare systems of the respective data converting unit 110 and the data transmission/reception processing unit 120.

The data relay unit 140 is the data relay unit 140 in the network 2 shown in FIG. 1, and includes ports 141 to 144, a table rewriting unit 150, and a corresponding port reference table storage unit 160.

The constituent elements of the network relay apparatus 100 will be explained first, and the constituent elements of the data relay unit 140 will then be explained. In the network relay apparatus 100, because the data converting unit 110a and the data transmission/reception processing unit 120a of the spare system are the same as the data converting unit 110 and the data transmission/reception processing unit 120, the detailed descriptions thereof are omitted.

In the network relay apparatus 100, the data transmission/reception processing unit 120 is a processing unit that performs transmission/reception processing of data with respect to the network 1. The data transmission/reception processing unit 120 includes a first data receiving unit 121, a data replicating unit 122, a second data receiving unit 123, and a data replicating unit 124. The data transmission/reception processing unit 120a similarly includes a first data receiving unit 121a, a data replicating unit 122a, a second data receiving unit 123a, and a data replicating unit 124a.

The first data receiving unit 121 receives main data from the network 1, and outputs to the data replicating unit 122. The main data, more specifically, as shown in FIG. 1, is the data addressed to the terminals 140a1 to 140an in the network 2 and transmitted from the terminals 200a1 to 200an in the network 3. The first data receiving unit 121a of the spare system receives the same data received by the first data receiving unit 121, from the network 1.

The data replicating unit 122, on receiving the main data from the first data receiving unit 121, replicates the data and generates the same two pieces of main data. Then, the data replicating unit 122 outputs one piece of data to the data converting unit 110, and the other piece of data to the data converting unit 110a.

The second data receiving unit 123 performs transmission/reception processing of sub data, which is different from the main data, with respect to the network 1. The sub data, similar to the main data, as shown in FIG. 1, is data addressed to the terminals 140a1 to 140an in the network 2 and transmitted from the terminals 200a1 to 200an in the network 3, but different from the main data. Because the sub data is processed by the data converting unit 110 having a failure (details will be described later), a certain amount of risk such as interruption of transmission and deterioration of quality is involved. Accordingly, it is preferable that the reliability of data is not questioned for the sub data.

The data replicating unit 124, on receiving the sub data from the second data receiving unit 123, replicates the data and generates the same two pieces of sub data. Then, the data replicating unit 124 outputs one piece of data to the data converting unit 110, and the other piece of data to the data converting unit 110a.

The data converting unit 110 is a processing unit that performs the transmission/reception processing of data with respect to the network 2 shown in FIG. 1. The data converting unit 110 includes a reception switching unit 111, a reception switching unit 112, a data selecting unit 113, a data converting unit 114, and a converted data transmitting unit 115. Similarly, the data converting unit 110a includes a reception switching unit 111a, a reception switching unit 112a, a data selecting unit 113a, a data converting unit 114a, and a converted data transmitting unit 115a.

The reception switching unit 111 has a function to switch the reception of main data either from the data transmission/reception processing unit 120 or the data transmission/reception processing unit 120a, and outputs the received main data to the data selecting unit 113. More specifically, the reception switching unit 111, based on the signal that instructs switching output from a switch switching controlling unit 132, which will be described later, switches to the data transmission/reception processing unit different from the data transmission/reception processing unit from which the main data has been received.

The reception switching unit 112 has a function to switch the reception of sub data either from the data transmission/reception processing unit 120 or the data transmission/reception processing unit 120a, and outputs the received sub data to the data selecting unit 113. More specifically, the reception switching unit 112, based on the signal that instructs switching output from the switch switching controlling unit 132, which will be described later, switches to the data transmission/reception processing unit different from the data transmission/reception processing unit from which the sub data has been received.

The data selecting unit 113 has a function to switch the reception of data either from the reception switching unit 111 or the reception switching unit 112, and outputs the received data to the data converting unit 114. More specifically, the data selecting unit 113, based on the signal that instructs switching output from the switch switching controlling unit 132, which will be described later, switches to the reception switching unit different from the reception switching unit from which the data has been received.

The data converting unit 114 converts a data structure to the different data structure from the present data structure. More specifically, when the network relay apparatus 100 is a node in the composite network shown in FIG. 1, the data converting unit 114, on receiving the data as a signal based on the SONET/SDH from the data selecting unit 113, converts the data into an Ethernet frame. The data converting unit 114 then outputs the data with the converted data structure to the converted data transmitting unit 115.

The converted data transmitting unit 115, on receiving the data whose data structure is converted by the data converting unit 114, from the data converting unit 114, transmits the data to the data relay unit 140.

The controlling unit 130 is a controlling unit that controls the entire network relay apparatus 100, and includes a failure handling unit 131, the switch switching controlling unit 132, and a control information transmitting unit 133.

The failure handling unit 131, when both systems of the data converting unit 110 and the data converting unit 110a are working normally, makes the data converting unit 110a of the spare system (or data converting unit 110) to perform the transmission/reception processing of the sub data. When a failure occurs in one of the data converting unit 110 and the data converting unit 110a, the failure handling unit 131 makes a normal system (one of the data converting unit 110a and data converting unit 110) to perform the transmission/reception processing of the main data.

More specifically, the failure handling unit 131 includes a failure portion detecting unit 131a, and detects whether a failure has occurred in the data converting unit 110 or in the data transmission/reception processing unit 120, using the failure portion detecting unit 131a. The failure handling unit 131 then identifies a portion where the failure has occurred by the same failure portion detecting unit 131a. Based on where the failure has occurred, the failure handling unit 131 specifies to the switch switching controlling unit 132, a region (reception switching unit 111, reception switching unit 112, data selecting unit 113, reception switching unit 111a, reception switching unit 112a, or data selecting unit 113a) where the switching is required. The failure handling unit 131, when the data selecting unit 113 and the data selecting unit 113a are included in the region where the switching is required, instructs to transmit control information with respect to the control information transmitting unit 133. Details on which region to specify, based on where the failure has occurred, will be explained in the following flowchart.

The switch switching controlling unit 132 switches the region where the switching is required. More specifically, the switch switching controlling unit 132, when the region where the switching is required is specified by the failure handling unit 131, outputs a signal that instructs switching with respect to the specified region.

When the role of the data converting unit 110 and the data converting unit 110a in the transmission/reception processing is switched as a result of switching by the failure handling unit 131, the control information transmitting unit 133 notifies the data relay unit 140 on a side of the network 2 that from then on, the main data is transmitted to a connecting unit different from the connecting unit that has been receiving the main data. The data relay unit 140 includes the connecting units (port 141 and port 143) with respect to the both systems of the network relay apparatus.

In the present embodiment, the content of the notification includes a request to change a table (such as a switching table if the data relay unit 140 is a layer 2 switch, and a routing table if the data relay unit 140 is a router) maintained in the data relay unit 140, so that a port at the side of the network relay apparatus 100, i.e., one of the ports that maintain a communication path for the sub data in the data relay unit 140, and a port different from that at the side of the network relay apparatus 100, i.e., one of the ports that maintain the communication path for the main data, are communicatively connected. However, the network relay apparatus 100 does not necessarily need to play a central role in specifically instructing the corresponding relationships of the ports with respect to the data relay unit 140. In other words, the instruction to change the table may not be included in the content of notification of the network relay apparatus 100, and the data relay unit 140 may play a central role in changing the corresponding relationships of the ports.

Referring back to the control information transmitting unit 133, more specifically, when the control information transmitting unit 133 is instructed to transmit the control information from the failure handling unit 131, the control information transmitting unit 133 transmits the control information to instruct that the two ports installed at the side of the network relay apparatus 100 form new corresponding relationships, by interchanging the ports that actually and respectively have the corresponding relationships.

In the data relay unit 140, the ports 141 to 144 are gates to input data into the data relay unit 140, or to output data from the data relay unit 140. In the data relay unit 140, the corresponding relationships of the ports 141 to 144 are maintained in the corresponding port reference table storage unit 160, and the data input from each port is output from a specific port corresponding to the each port.

Figure 3:
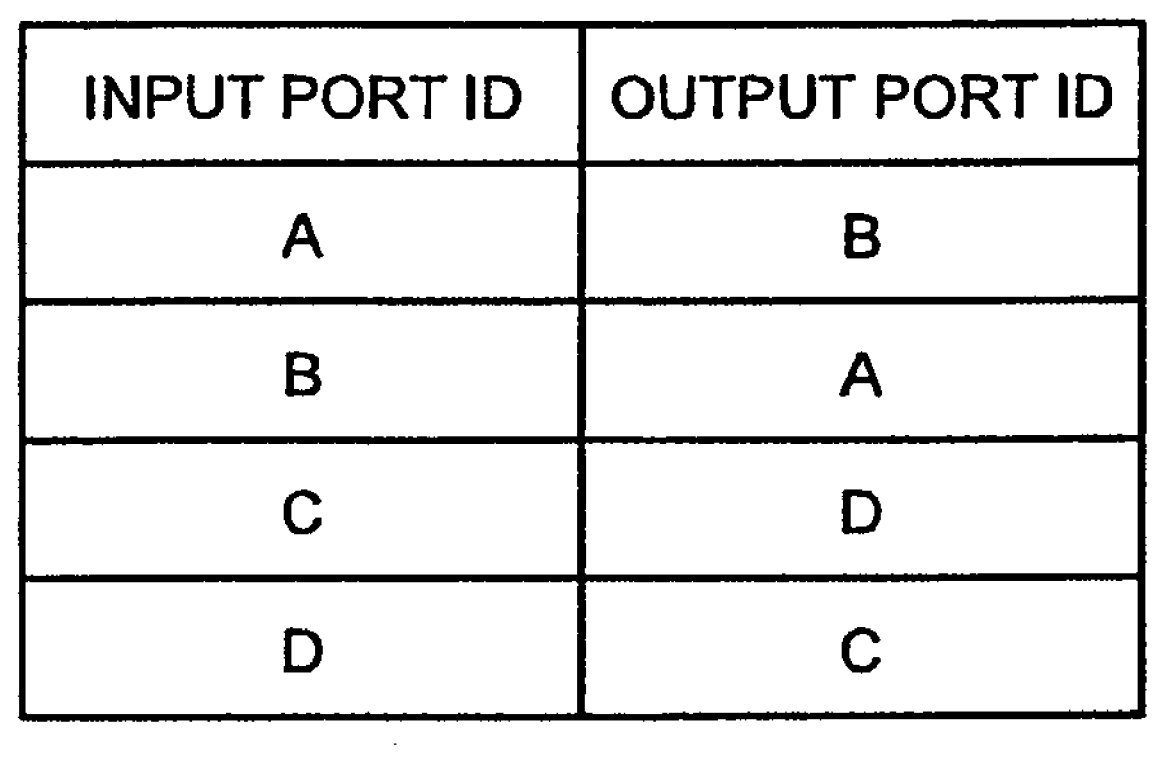

The corresponding port reference table storage unit 160 maintains a table that determines from which port the data input from a predetermined port should be output. More specifically, as shown in FIG. 3, the corresponding port reference table storage unit 160, with respect to an input port ID that indicates a port to which the data is input, correspondingly stores therein an output port ID that indicates a port to output the data. For example, as shown in FIG. 3, the corresponding port reference table storage unit 160 correspondingly stores therein an input port ID "AA" and an output port ID "B". The IDs to identify the ports 141 to 144 in FIG. 2 are as follows: the port 141 is "A", the port 142 is "B", the port 143 is "C", and the port 144 is "D". FIG. 3 is an example of information stored in the corresponding port reference table storage unit 160.

The table rewriting unit 150 rewrites the corresponding relationships stored in the corresponding port reference table storage unit 160. More specifically, on receiving the control information from the control information transmitting unit 133, the table rewriting unit 150 rewrites and change the corresponding relationships of ports actually maintained in the corresponding port reference table storage unit 160. For example, if the corresponding relationships are as shown in FIG. 3, the rewriting may be performed so that the output port ID "D" corresponds to the input port ID "A", the output port ID "C" corresponds to the input port ID "B", the output port ID "B" corresponds to the input port ID "C", and the output port ID "A" corresponds to the input port ID "D".

Finally, a flow of data is described with reference to FIG. 2. With the functions of each unit that have been explained, a communication path for data as shown by solid lines in FIG. 2, is established in the network relay apparatus 100 and the data relay unit 140. On the communication path, four types of data indicated by a solid line arrow with an open arrowhead (main data of working system), a dotted line arrow with an open arrowhead (main data of spare system), a solid line arrow with a black triangle arrowhead (sub data of working system), and a dotted line arrow with a black triangle arrowhead (sub data of spare system) flow. After the four types of data pass through each unit, the data indicated by the solid line arrow with an open arrowhead (main data of working system) is output from the port 142, and the data indicated by the solid line arrow with a black triangle arrowhead (sub data of working system) is output from the port 144 eventually.

Figure 4:
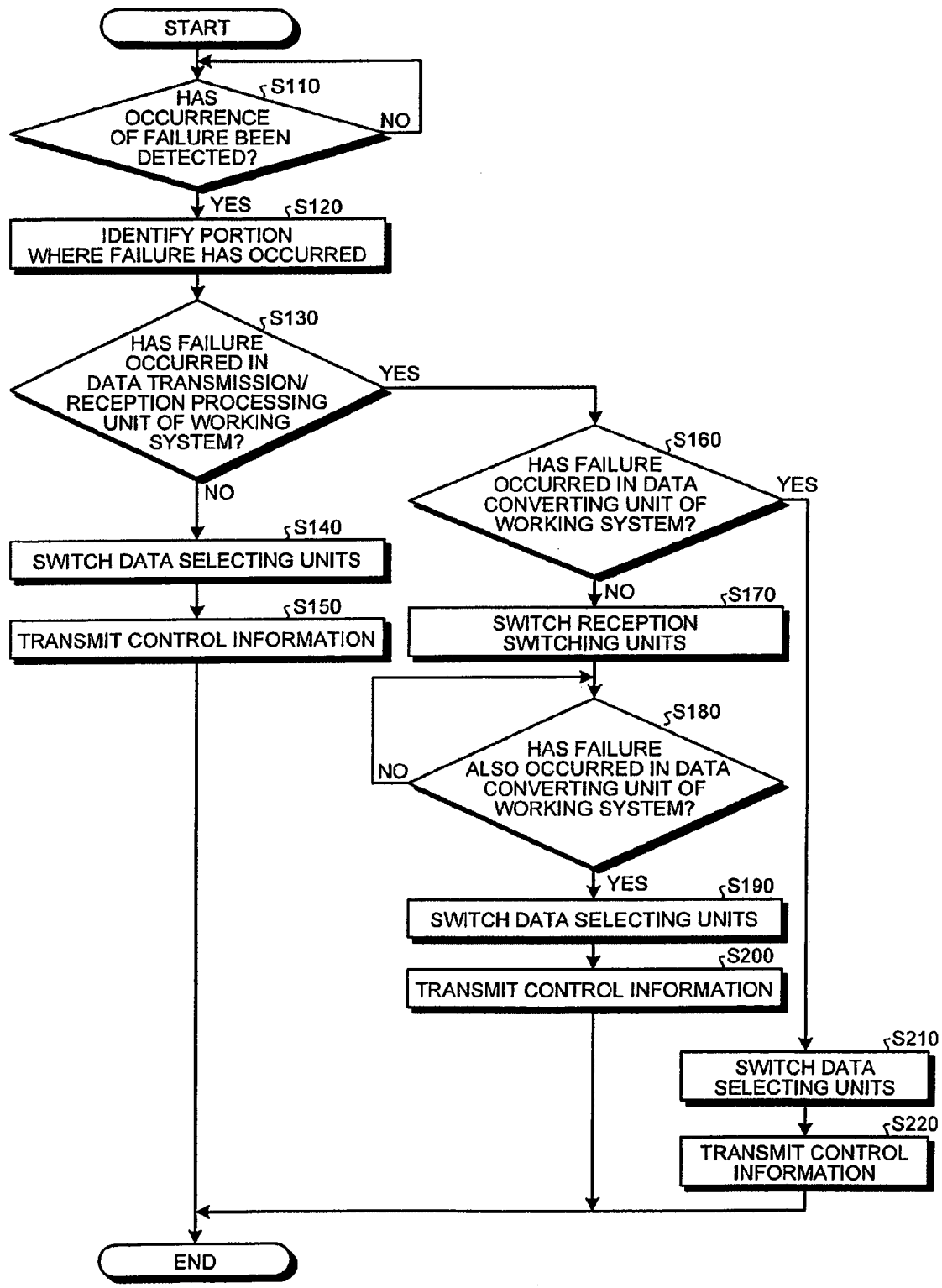
FIG. 4 is a flowchart of a processing flow performed by a controlling unit.

A processing operation performed by the controlling unit 130 in the network relay apparatus 100 will now be explained with reference to a flowchart in FIG. 4. The processing flow shown in FIG. 4 is a process repeatedly executed while the network relay apparatus 100 is operating. The processing operation performed by the controlling unit 130 will be explained with reference to FIG. 4, and a change in the data flow will be explained with reference to FIG. 2, and FIGS. 5 to 8.

The failure handling unit 131, on detecting the occurrence of a failure by the failure portion detecting unit 131a (Yes at step S110), identifies the portion where the failure occurs by the same failure portion detecting unit 131a (step S120).

If a failure occurs only in the data converting unit 110 of the working system (No at step S130), the switch switching controlling unit 132 switches the data selecting unit 113 and the data selecting unit 113a (step S140), and the control information transmitting unit 133 transmits control information (step S150).

Figure 5:
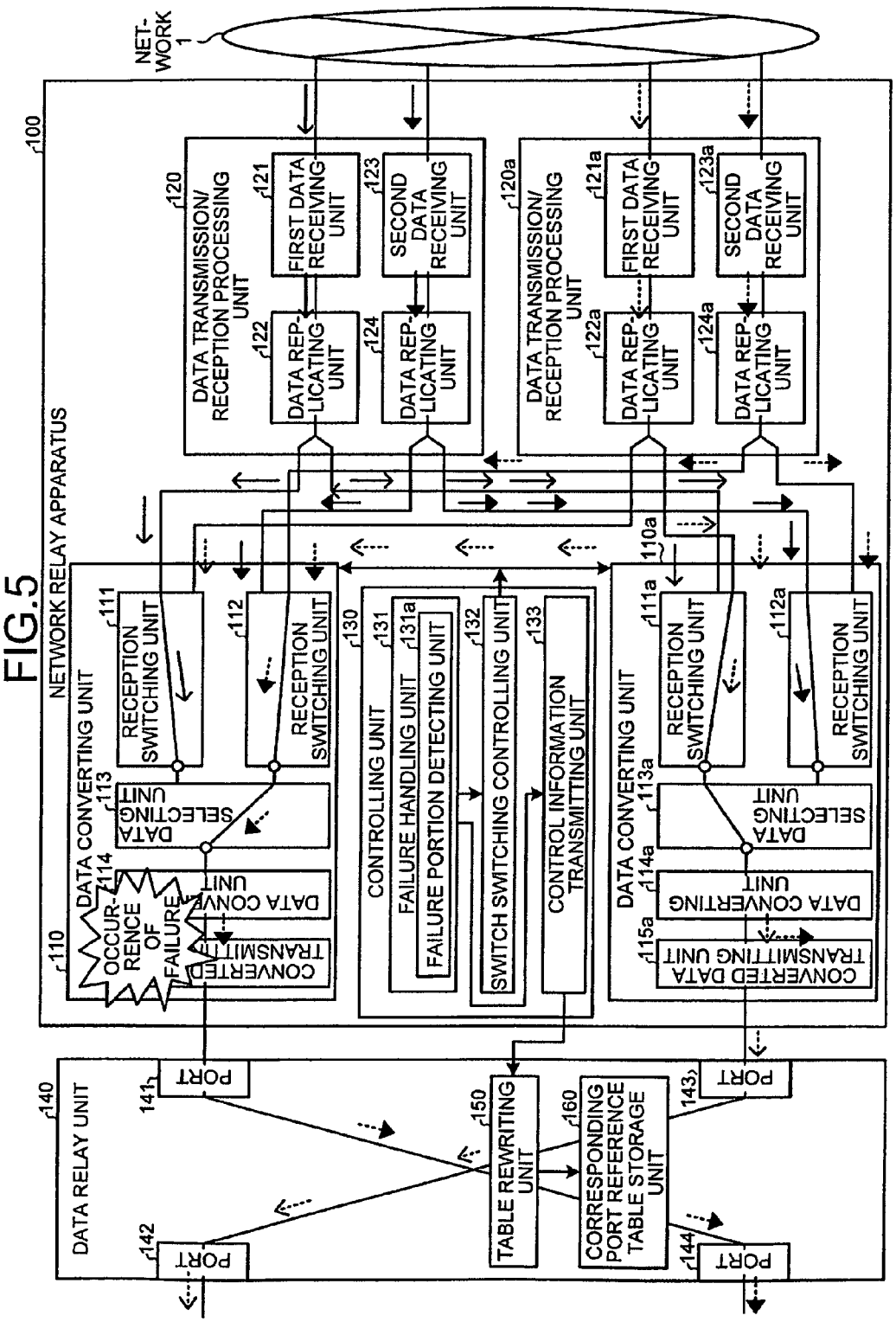
FIG. 5 is an explanatory view of a change in a data flow.

In this manner, the communication path indicated by the solid lines in FIG. 2 switches to the communication path indicated by the solid lines in FIG. 5. In other words, the data selecting unit 113 switches to the reception switching unit 112 from the reception switching unit 111, from which the data selecting unit 113 has been receiving the data. Similarly, the data selecting unit 113a switches to the reception switching unit 111a, from the reception switching unit 112a. The corresponding relationships of the ports 141 to 144 in the data relay unit 140 are changed so that the port 141 corresponds to the port 144, and the port 143 corresponds to the port 142. As a result, the dotted line arrow with an open arrowhead (main data of spare system) is output from the port 142, and the dotted line arrow with a black triangle arrowhead (sub data of spare system) is output from the port 144 eventually. Because the sub data of the spare system is processed by the data converting unit 110 having a failure, a certain amount of risk such as interruption of transmission and deterioration of quality is involved.

Referring back to step S130 in FIG. 4, when a failure occurs only in the data transmission/reception processing unit 120 of the working system (Yes at step S130 and No at step S160), the switch switching controlling unit 132 switches the reception switching unit 111 and the reception switching unit 112a (step S170).

Figure 6:
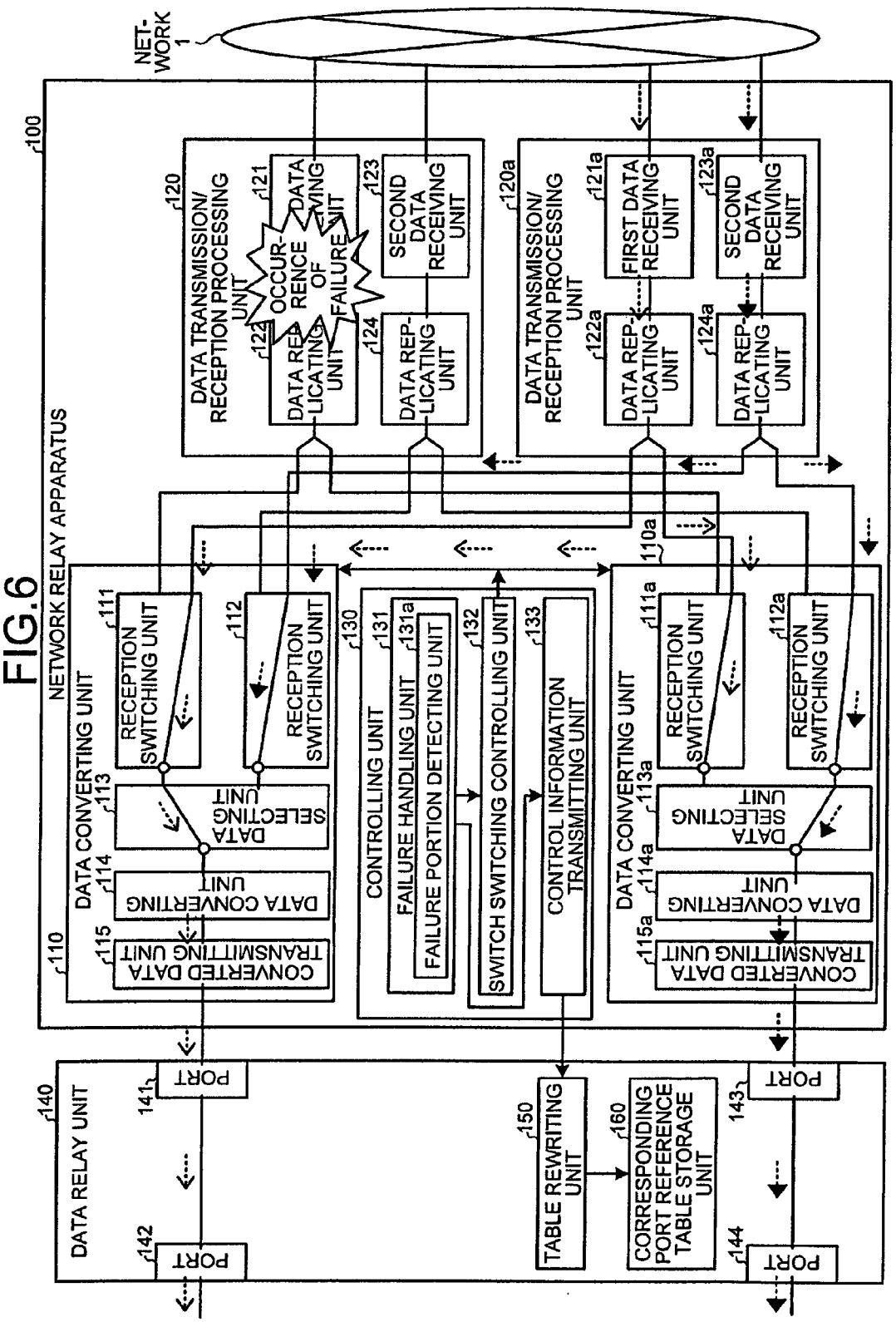
FIG. 6 is another explanatory view of a change in the data flow.

In this manner, the communication path indicated by the solid lines in FIG. 2, switches to the communication path indicated by the solid lines shown in FIG. 6. In other words, the reception switching unit 111 switches to the data replicating unit 122a from the data replicating unit 122, from which the reception switching unit 111 has been receiving the data. Similarly, the reception switching unit 112a switches to the data replicating unit 124a from the data replicating unit 124. As a result, the dotted line arrow with an open arrowhead (main data of spare system) is output from the port 142, and the dotted line arrow with a black triangle arrowhead (sub data of spare system) is output from the port 144 eventually.

Referring back to step S170 in FIG. 4, when a further failure occurs in the data converting unit 110 of the working system (Yes at step S180), the switch switching controlling unit 132 switches the data selecting unit 113 and the data selecting unit 113a (step S190), and the control information transmitting unit 133 transmits the control information (step S200).

Figure 7:
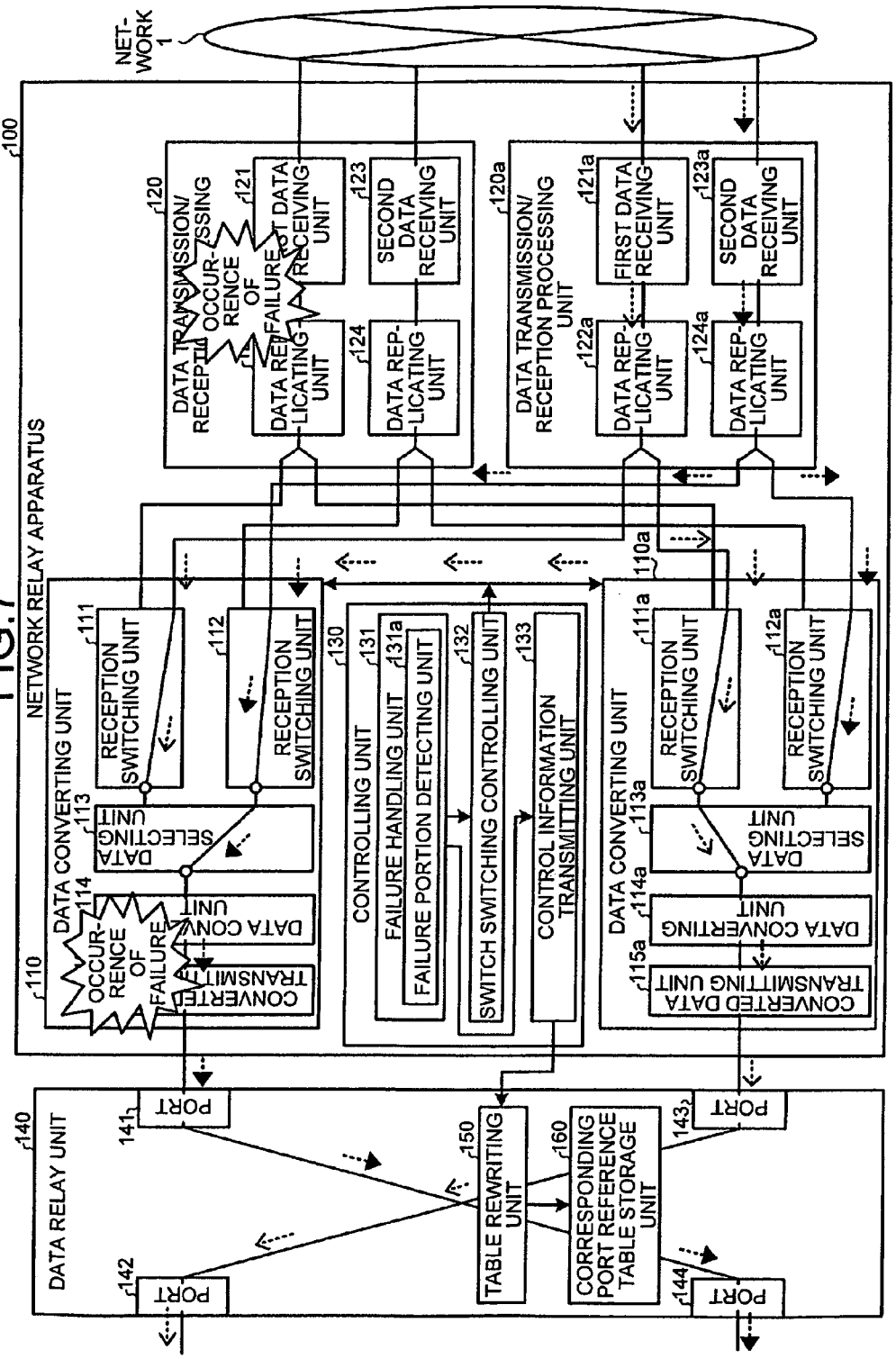
FIG. 7 is still another explanatory view of a change in the data flow.

In this manner, the communication path indicated by the solid lines in FIG. 2 switches to the communication path indicated by the solid lines in FIG. 7. In other words, the data selecting unit 113 switches to the reception switching unit 112 from the reception switching unit 111, from which the data selecting unit 113 has been receiving the data. Similarly, the data selecting unit 113a switches to the reception switching unit 111a from the reception switching unit 112a. In the data relay unit 140, the corresponding relationships of the ports change so that the port 141 corresponds to the port 144, and the port 143 corresponds to the port 142. As a result, the dotted line arrow with an open arrowhead (main data of spare system) is output from the port 142, and the dotted line arrow with a black triangle arrowhead (sub data of spare system) is output from the port 144. Because the sub data of the spare system is processed by the data converting unit 110 having a failure, a certain amount of risk such as interruption of transmission and deterioration of quality is involved.

Referring back to step S130 in FIG. 4, when a failure occurs in the data transmission/reception processing unit 120 of the working system, and also in the data converting unit 110 of the working system (Yes at step S160), the switch switching controlling unit 132 switches the data selecting unit 113 and the data selecting unit 113a (step S210). The control information transmitting unit 133 then transmits the control information (step S220), thereby finishing the process.

Figure 8:
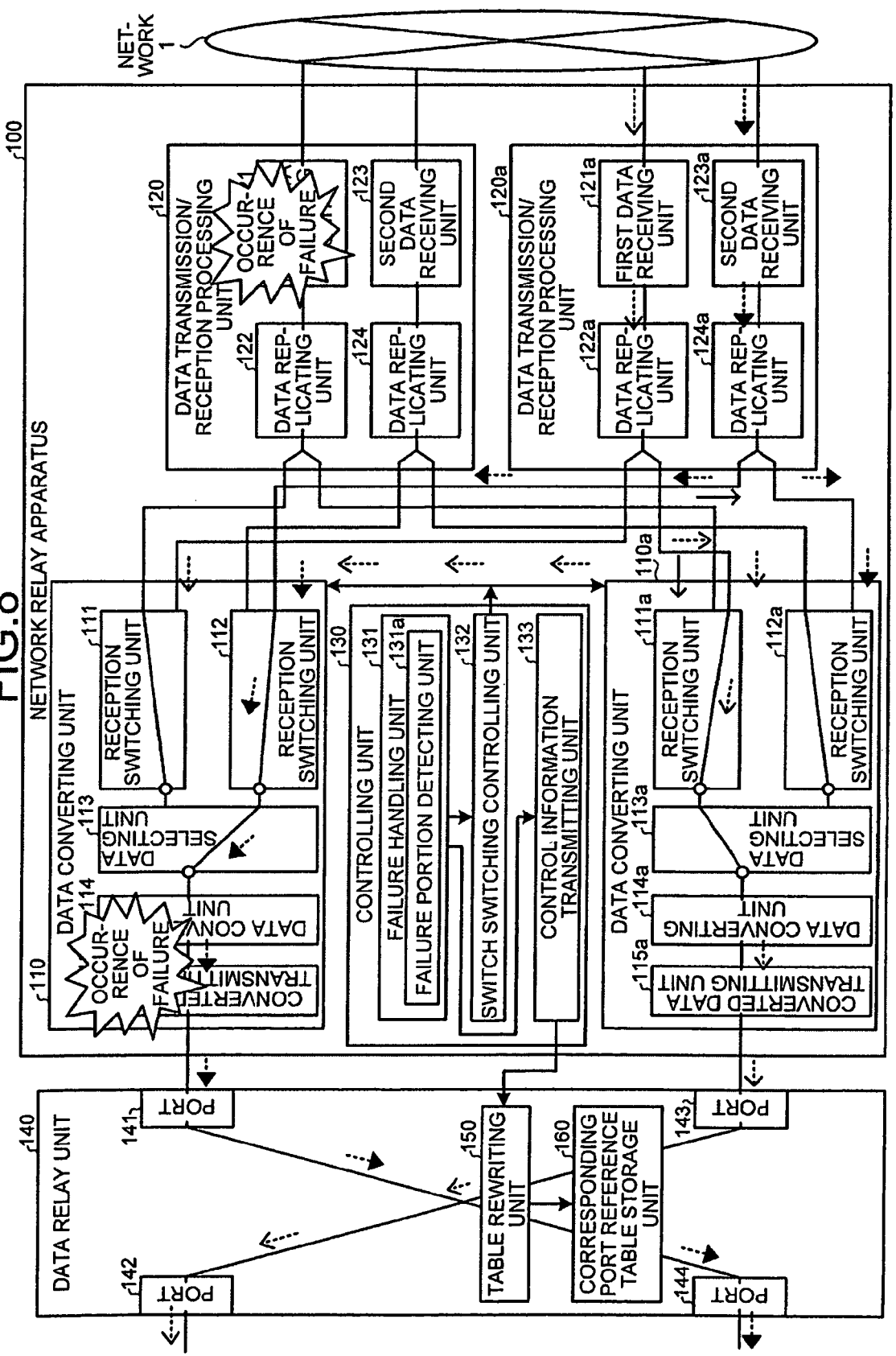
FIG. 8 is still another explanatory view of a change in the data flow.
Figure 9:
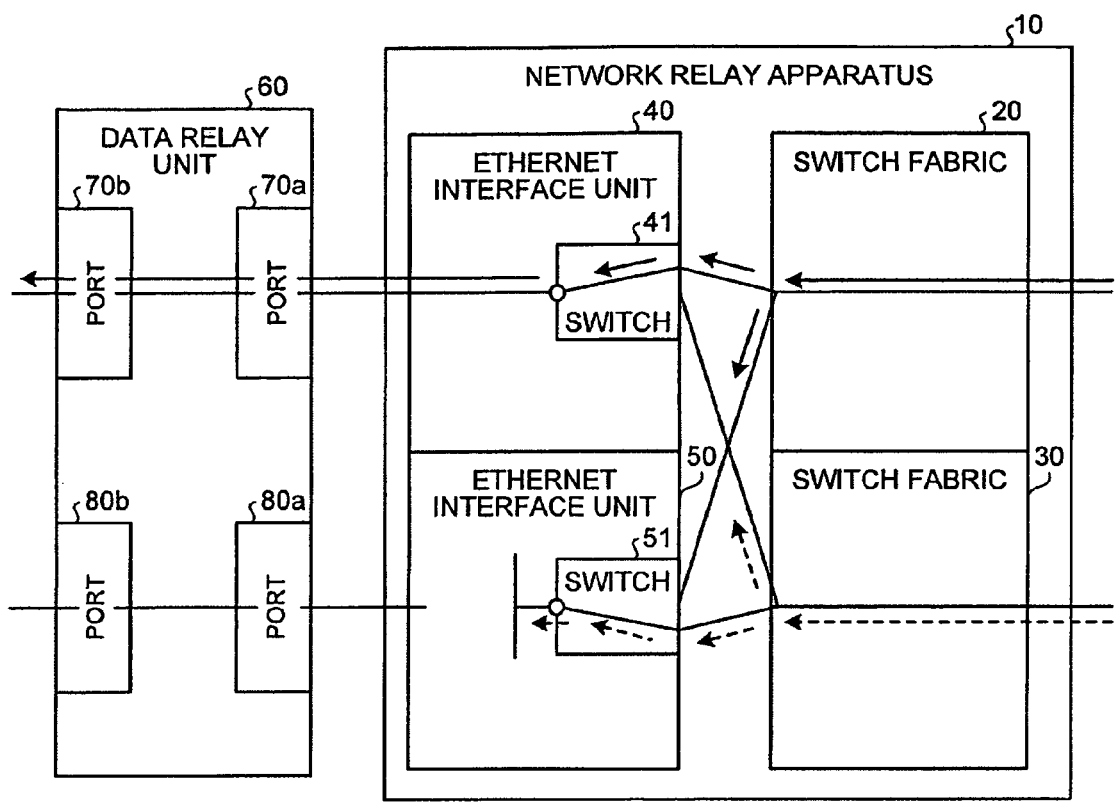
FIG. 9 is an explanatory view of a related art.

In this manner, the communication path indicated by the solid lines in FIG. 2 switches to the communication path indicated by the solid lines in FIG. 8. In other words, the data selecting unit 113 switches to the reception switching unit 112 from the reception switching unit 111, from which the data selecting unit 113 has been receiving the data. Similarly, the data selecting unit 113a switches to the reception switching unit 111a from the reception switching unit 112a. In the data relay unit 140, the corresponding relationships of the ports are changed so that the port 141 corresponds to the port 144, and the port 143 corresponds to the port 142. As a result, the dotted line arrow with an open arrowhead (main data of spare system) is output from the port 142, and the dotted line arrow with a black triangle arrowhead (sub data of spare system) is output from the port 144 eventually. Because the sub data of the spare system is processed by the data converting unit 110 having a failure, a certain amount of risk such as interruption of transmission and deterioration of quality is involved.

Advantages of First Embodiment

According to the first embodiment, the data transmission/reception processing units 120 and 120a of the working system and the spare system perform the transmission/reception processing of the sub data, which is different from the main data. When the both systems of the data converting unit 110 and the data converting unit 110a are working normally, the data converting unit 110a of the spare system performs the transmission/reception processing of the sub data. When a failure has occurred in any of the systems of the data converting unit 110 and the data converting unit 110a, a normal system of the data converting unit 110 (or data converting unit 110a) performs the transmission/reception processing of the main data. When the data converting unit 110 and the data converting unit 110a switch the role in the transmission/reception processing of the main data, the data relay unit 140 is notified that from then on the main data is transmitted to the connecting unit different from the connecting unit that has been receiving the main data. The data relay unit 140 includes the connecting units for both systems of the network relay apparatus 100 in the network 2 (such as Ethernet). The data relay unit 140, based on the notified content, changes the corresponding relationships of the ports managed in the data relay unit 140, so as to output the received main data from the same output port as before. In this manner, it is possible to make the sub data flow to the port installed in the data relay unit 140, to acquire resistance against failure with respect to the communication path of the main data. In other words, it is possible to advantageously utilize the port.

According to an aspect of the present invention, when the sub data different from the main data is received, and when the communication paths of the working system and the spare system are both working normally, the sub data flows through the communication path of the spare system. When a failure has occurred in the communication path of the working system, the communication path for the main data is switched to the spare system, and the data relay unit, which is a relay destination of the main data, is notified accordingly. In this manner, if the data relay unit changes the corresponding relationships of the ports managed in the unit, so as to output the received main data from the same output port as before, based on the notified content, it is possible to make the sub data flow to the port installed in the data relay unit to acquire resistance against failure with respect to the communication path for the main data. As a result, it is possible to advantageously utilize the port.

According to another aspect of the present invention, because new corresponding relationships of the ports in the data relay unit are included in the content of notification, it is possible to reduce the processing load of the data relay unit, compared with the method that makes the data relay unit changing the corresponding relationships of the ports.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network relay apparatus performing relay processing of data between a first network and a second network, and provided with a redundant structure to handle failure in relay processing of main data in a working system using a spare system, comprising:

a working-system first data transmission/reception processing unit that performs data transmission/reception processing with respect to the first network, and that includes a sub-data transmission/reception processing unit that performs transmission/reception processing of sub data which is different from the main data with respect to the first network;

a working-system second data transmission/reception processing unit that performs data transmission/reception processing with respect to the second network;

a spare-system first data transmission/reception processing unit that performs data transmission/reception processing with respect to the first network, and that includes a sub-data transmission/reception processing unit that performs transmission/reception processing of sub data which is different from the main data with respect to the first network;

a spare-system second data transmission/reception processing unit that performs data transmission/reception processing with respect to the second network;

a data transmission/reception controlling unit that causes the spare-system second data transmission/reception processing unit to perform the transmission/reception processing of the sub data when the working-system second data transmission/reception processing unit and the spare-system second data transmission/reception processing unit operate normally, and causes a normal one of the working-system second data transmission/reception processing unit and the spare-system second data transmission/reception processing unit to perform the transmission/reception processing of the main data when a failure occurs in one of the working-system second data transmission/reception processing unit and the spare-system second data transmission/reception processing unit; and a notifying unit that notifies, when the data transmission/reception controlling unit causes change in units dealing with the transmission/reception processing of the main data between the working-system second data transmission/reception processing unit and the spare-system second data transmission/reception processing unit, a data relay unit provided with a connection unit for each of the working system and the spare system on a side of the second network, that the main data is now on transmitted to a connection unit which is different from a connection unit which has been receiving the main data.

2. The network relay apparatus according to claim 1, wherein the data relay unit is a layer 2 switch, and the notifying unit notifies a request to change a switching table in the layer 2 switch, so that a port at a side of the network relay apparatus between ports that maintain a communication path for the sub data in the layer 2 switch, and a port different from a port at the side of the network relay apparatus between ports that maintain the communication path for the main data are communicatively connected.

3. The network relay apparatus according to claim 1, wherein the data relay unit is a router, and the notifying unit notifies a request to change a routing table in the router, so that a port at a side of the network relay apparatus between ports that maintain a communication path for the sub data in the router, and a port different from a port at the side of the network relay apparatus between ports that maintain the communication path for the main data are communicatively connected.

* * * * *